United States Patent [19]

Gaiser

[11] 4,414,811

[45] Nov. 15, 1983

[54] MASTER CYLINDER

[75] Inventor: Robert F. Gaiser, Stevensville, Mich.

[73] Assignee: The Bendix Corporation, Southfield, Mich.

[21] Appl. No.: 235,785

[22] Filed: Feb. 19, 1981

[51] Int. Cl.³ .............................................. B60T 11/28
[52] U.S. Cl. ....................................... 60/589; 60/562
[58] Field of Search .................. 60/562, 578, 589, 588

[56] References Cited

U.S. PATENT DOCUMENTS

| 2,672,009 | 3/1954 | Hense | 60/578 |
|---|---|---|---|
| 3,487,641 | 1/1970 | Hackett | 60/589 |
| 3,633,367 | 1/1972 | Baldwin | 60/589 |
| 3,946,563 | 3/1976 | Rivetti | 60/562 |
| 4,091,619 | 5/1978 | Carre | 60/562 |
| 4,132,073 | 1/1979 | Ewald | 60/589 |
| 4,249,381 | 2/1981 | Gaiser | 60/562 |
| 4,329,846 | 5/1982 | Gaiser | 60/562 |

FOREIGN PATENT DOCUMENTS 2017240 10/1979 United Kingdom ................. 60/589

Primary Examiner—Abraham Hershkovitz
Attorney, Agent, or Firm—Paul D. Schoenle; Ken C. Decker

[57] ABSTRACT

A master cylinder (10) includes a housing (24) defining a bore (26) therein and a fluid reservoir (38) communicating with the bore via a passage (30). A stepped piston (94) is reciprocally received in the bore and cooperates with the housing to define a pair of variable-volume pressure chambers (108, 110). An annular valve apparatus (106) circumscribes the stepped piston within the housing bore and sealingly cooperates with the stepped piston and housing to bound the pair of variable-volume pressure chambers. The valve apparatus is pressure responsive to control fluid communication between the pair of pressure chambers and through the passage.

6 Claims, 5 Drawing Figures

MASTER CYLINDER

The invention relates to a master cylinder having a housing defining a bore therein. A fluid reservoir communicates with the bore via a passage. A stepped piston is movably received within the bore and cooperates with the housing to define a pair of variable-volume pressure chambers. A valve assembly is received in the bore adjacent the passage. The valve assembly movably and sealingly cooperates with the housing and piston to control fluid communication between the pair of pressure chambers and between the fluid reservoir and the pressure chambers as a function of the fluid pressures in the pair of pressure chambers. When the stepped piston is moved responsive to an operator input to contract the pair of pressure chambers and pressurize the fluid trapped therein, one pressure chamber changes volume at a faster rate than the other pressure chamber. The other pressure chamber communicates via an outlet with a fluid pressure responsive device. The valve apparatus closes communication between the pressure chambers and the reservoir in response to the operator input so that pressurized fluid is forced from the one pressure chamber into the other pressure chamber. Consequently, the volume of pressurized fluid delivered through the outlet to the fluid pressure responsive device is greater than the volume change of the other pressure chamber. Additionally, when the pressure of the pressurized fluid in the pair of pressure chambers reaches a predetermined level, the valve assembly vents the one pressure chamber to the reservoir so that the operator input is resisted only by fluid pressure in the other pressure chamber. As a result, the fluid trapped in the other pressure chamber is pressurized to a higher pressure level.

A master cylinder is known in accordance with the U.S. Pat. No. 4,133,178, issued Jan. 9, 1979, to F. W. Brooks, Sr., in which the master cylinder includes a housing defining a stepped bore movably receiving a stepped piston to define a pair of variable-volume pressure chambers. The effective diameters defined by the stepped piston are related so that the one pressure chamber changes volume at a faster rate than the other pressure chamber in response to movement of the piston within the housing. The other pressure chamber communicates via an outlet with a fluid pressure responsive device. The pressure chambers communicate with a fluid reservoir via a passage. A valve apparatus is received in the passage. The valve apparatus includes a lip seal allowing fluid flow through the passage only toward the pressure chambers. The valve apparatus also includes a spring-loaded check valve which is normally open and closes responsive to an operator input moving the stepped piston to contract the pair of pressure chambers. When the check valve is closed it allows fluid flow through the passage toward the reservoir in response to a predetermined pressure in the one pressure chamber. The stepped piston carries a cup seal bounding the one pressure chamber and defines a cam surface cooperating with a stem of the check valve to open and close the check valve in response to movement of the stepped piston. When the stepped piston is moved in response to a operator input, the check valve closes to trap fluid in the one pressure chamber. The one pressure chamber changes in volume at a faster rate than the other pressure chamber so that pressurized fluid is forced past the cup seal into the other pressure chamber. The volume of pressurized fluid delivered through the outlet is, therefore, larger than the volume change of the other pressure chamber. When the pressure of the pressurized fluid in the one pressure chamber reaches a predetermined level, the check valve opens to vent the one pressure chamber to the reservoir. Consequently, the operator input is resisted principally by the pressurized fluid in the other pressure chamber.

With a master cylinder of the type illustrated in the Brooks, Sr., patent, the valve apparatus comprised a multitude of component parts; the manufacture of which adds significantly to the cost of the master cylinder. Additionally, the housing must provide a precisely machined bore for receiving the valve apparatus. Further, the check valve must include a stem and the stepped piston must define a precise cam surface for cooperating with the stem of the check valve. All in all, the master cylinder illustrated in the Brooks, Sr., patent is a complex device including many precisely made and expensive components so that the master cylinder is expensive to manufacture.

A further consideration with the master cylinder illustrated by the Brooks, Sr., patent is that even though the check valve is a dual-area type so that its opening pressure is approximately twice the pressure needed to maintain the valve open, the one pressure chamber is never completely vented to the reservoir during an operator input. The residual pressure remaining in the one pressure chamber after the check valve opens acts on the larger effective area defined by the stepped piston to resist the operator input. As a result, the operator input is not entirely effective to pressurize fluid trapped in the other pressure chamber. Part of the operator input is "wasted" because it is resisted by the residual pressure in the one pressure chamber. The efficiency of the master cylinder in terms of output pressure versus operator input force is reduced by the residual pressure in the one pressure chamber.

The invention as claimed is intended to avoid the shortcomings of prior master cylinders by providing a master cylinder in which an annular valve apparatus is received in a bore receiving a stepped piston. The valve apparatus circumscribes the smaller diameter portion of the stepped piston and cooperates with the stepped piston and a housing to bound a pair of variable-volume pressure chambers. The housing defines a passage communicating the fluid reservoir with the pair of pressure chambers. The valve apparatus controls fluid communication between the pair of pressure chambers and between the fluid reservoir and the pressure chambers as a function of the fluid pressures in the pair of pressure chambers. More specifically, during an operator input the stepped piston is moved to trap and pressurize fluid in the pair of pressure chambers. When a predetermined pressure differential is reached between the pair of pressure chambers, the valve apparatus vents the one pressure chamber to the reservoir via the passage so that substantially no residual pressure remains in the one pressure chamber. Consequently, a master cylinder according to the invention attains nearly one hundred percent efficiency in terms of output pressure versus operator input force.

The advantages offered by the invention are mainly that the master cylinder housing need not provide a separate bore for receiving the valve apparatus because the valve apparatus is received by the same bore receiving the stepped piston; relatively few component parts are included by the valve apparatus so that the master cylinder is inexpensive to manufacture; and a master cylinder according to the invention attains nearly one hundred percent efficiency in terms of output pressure versus operator input force.

One way of carrying out the invention is described in detail below with reference to drawing figures which illustrate only the one embodiment of the invention, in which.

Figure 1:
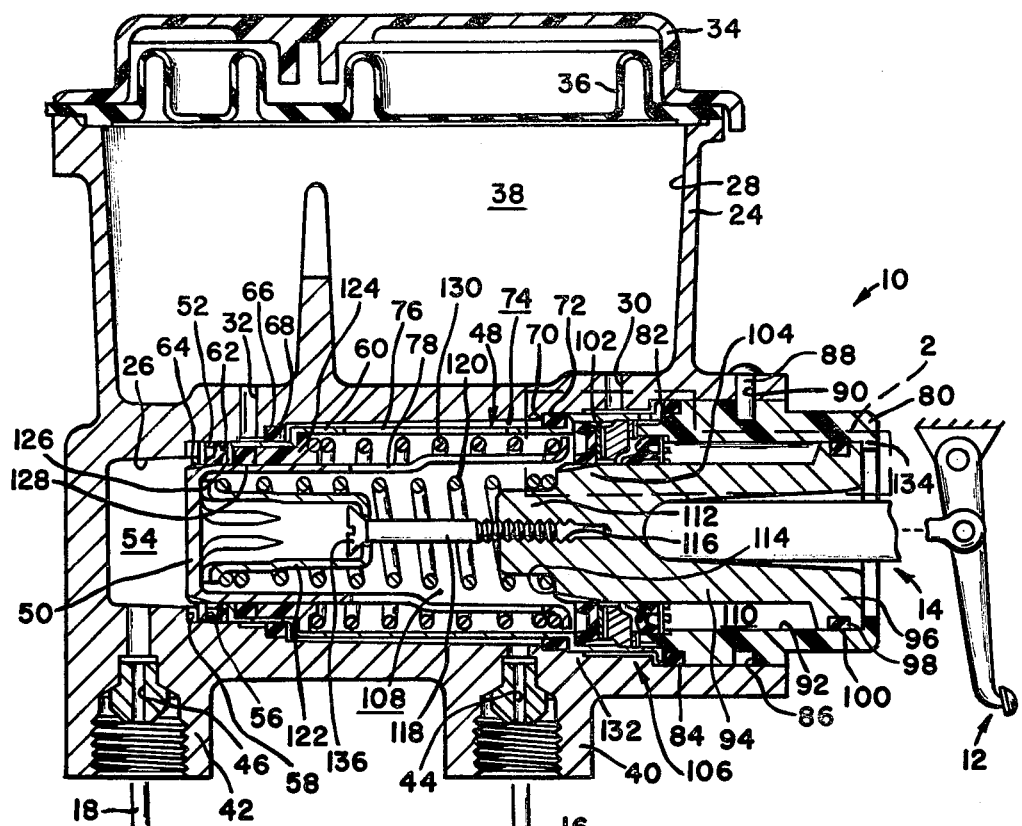
FIG. 1 is a fragmentary cross-sectional view of a master cylinder embodying the invention.

The Figures illustrate a master cylinder 10 in the context of a hydraulic braking system for an automotive vehicle. The braking system includes a brake pedal 12 by which an operator input force may be applied to the master cylinder 10 through an input rod 14. The master cylinder 10 transforms the operator input into a hydraulic pressure which is transmitted via conduits 16 and 18 to pairs of brakes 20 and 22 on respective axles of the vehicle.

The master cylinder 10 includes a housing 24 defining a stepped bore 26 therein. The housing 24 also defines a recess 28 communicating with the bore 26 via a pair of passages 30 and 32. A cap 34 carrying an elastomeric diaphram 36 closes the recess 28. The recess 28, cap 34 and diaphragm 36 cooperate to define a closed reservoir 38 for holding a hydraulic fluid or oil. The fluid in reservoir 38 is maintained at substantially atmospheric pressure because the cap 34 defines an aperture 39 opening to the upper side of the diaphram 36. The housing 24 defines a pair of bosses 40 and 42 defining respective outlets 44 and 46 communicating with the bore 26 and with the conduits 16 and 18, respectively.

The housing 24 is a die cast part so that the walls of the recess 28 and of the stepped bore 26 taper outwardly toward the openings of the recess and bore because of the draft on the cores defining the recess and bore during the casting operation. The taper on the cores allows them to be removed after the housing has solidified from the molten state.

A piston assembly 48 is received in the bore 26. The piston assembly 48 includes a cup-shaped piston 50 cooperating with a lip seal 52 to bound a variable-volume pressure chamber 54 communicating via outlet 46 with the brakes 22. The lip seal 52 is received in an annular recess 56 defined between a step 58 on the bore 26 and the left end of a sleeve member 60. An axially extending protrusion 62 on the back of the lip seal 52 spaces the lip seal 52 from the left end of the sleeve member 60 to provide for fluid communication therebetween. An axially extending notch 64 on the cup-shaped piston 50 provides for fluid communication between the reservoir 38 and chamber 54 via the space between the lip seal 52 and the sleeve member 60. The sleeve member 60 cooperates with a step 66 on the bore 26 to define an annular recess receiving a sealing member 68. Similarly, the sleeve member 60 cooperates with a step 70 on the bore 26 to define an annular recess receiving a sealing member 72. The sleeve member 60, sealing members 68 and 72 and housing 24 cooperate to bound an annular chamber 74 communicating with the outlet 44. A multitude of slots 76 and 78 defined by the sleeve member 60 and by the cup-shaped piston 50 communicate the annular chamber 74 with the interior of the sleeve member and cup-shaped piston, respectively.

A bearing member 80 is received in the bore 26 and cooperates with a step 82 thereon to define an annular recess receiving a sealing member 84. The bearing member 80 defines an annular groove 86 receiving the end of a pin 88 press fitted into a bore 90 defined by the housing 24 to lock the bearing member 80 in the bore 26. A bore 92 defined in the bearing member 80 is substantially concentric with the bore 26 and slidably receives a stepped piston 94. The large diameter portion 96 of the stepped piston 94 defines an annular groove 98. An annular sealing member 100 received in the groove 98 sealingly cooperates with the bearing member 80.

The sleeve member 60 and bearing member 80 cooperate to define an annular recess 102 circumscribing the small diameter portion 104 of the stepped piston 94. An annular valve apparatus 106, the structure of which is to be hereinafter explained, is received in the recess 102 and sealingly cooperates with the sleeve member 60, bearing member 80 and stepped piston 94. The cup-shaped piston 50, sleeve member 60, housing 24, stepped piston 94, and valve apparatus 106 cooperate to define a variable-volume pressure chamber 108. Similarly, bearing member 80, stepped piston 94, and valve apparatus 106 cooperate to define a variable volume pressure chamber 110.

The stepped piston 94 includes an axially extending boss 112 which cooperates with the small diameter portion 104 to define a shoulder 114. The boss 112 defines a bore 116 threadably receiving a cap screw 118. A compression spring 120 engages the shoulder 114 and extends to a spring retainer 122 received on the cap screw 118. The sleeve member 60 receives a seat member 124 cooperating with a radially inwardly extending flange 126 on the sleeve member 60 to define an annular recess receiving a sealing member 128 sealingly cooperating with the cup-shaped piston 50. A compression spring 130 extends from the seat member 124 to a radially outwardly extending flange 132 on the cup-shaped piston 50. The spring 130 biases the cup-shaped piston 50 rightwardly relative to the sleeve member 60 and housing 24. Similarly, the spring 120 biases the stepped piston 94 rightwardly relative to the cup-shaped piston 50 and into engagement with a radially inwardly extending flange 134 defined by the bearing member 80. The preload and/or spring rate of the spring 120 is greater than that of the spring 130 so that the spring retainer 122 engages the head 136 of the cap screw 118 to establish a normal or nonbraking position for the master cylinder 10, as is illustrated by FIG. 1.

Figure 2:
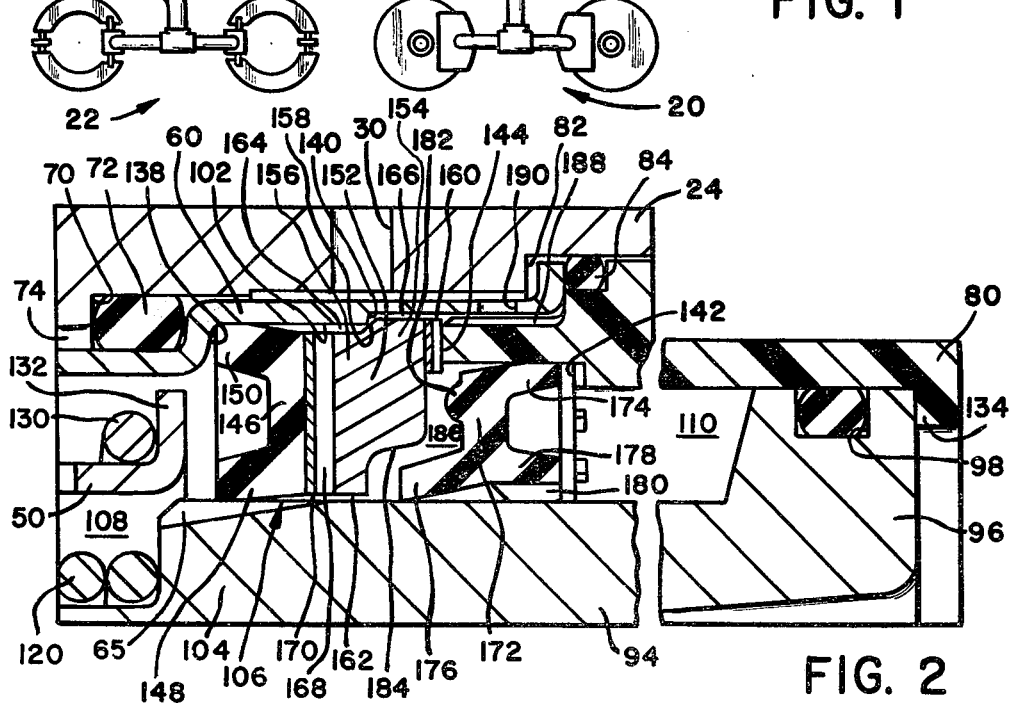
FIG. 2 illustrates an encircled portion of FIG. 1 enlarged to better show details of the master cylinder in a normal or non-braking condition.

Turning now to FIG. 2, the recess 102 is defined by cooperating steps 138, 140 and 142 on the sleeve member 60 and bearing 80, respectively, and by the end edge 144 of the bearing member 80. The valve apparatus 106 includes an annular elastomeric lip seal 146 having concentrically arranged yieldable lips 148 and 150 disposed toward the pressure chamber 108. The lips 148 and 150 sealingly and movably engage the piston 94 and sleeve member 60, respectively. An annular valve member 152 is movably received in the recess 102 and includes a larger diameter portion 154 cooperating with a smaller diameter portion 156 to define a valving surface 158 sealingly engageable with the step 140. Consequently, the step 140 defines a valve seat cooperating with the valving surface 158. An annular resilient member or wave spring 160 engages the valve member 152 and the end edge 144 of the bearing member 80 to bias the valve member into sealing engagement with the seat 140. The valve member 152 defines axially extending radial clearances 162 and 164, 166 with the stepped piston 94 and sleeve member 60, respectively. A multitude of radially extending grooves 168 on the valve member 152 communicate the clearance 162 with the clearance 164. An annular support member 170 abuts the valve member 152 and the lip seal 146. An annular elastomeric sealing member 172 sealingly and movably cooperates with the stepped piston 94 and bearing member 80. The sealing member 172 is somewhat Z-shaped in cross section (though having a reversed Z-shape as illustrated in FIG. 2) and includes a pair of oppositely disposed yieldable lips 174 and 176 which sealingly engage the bearing member 80 and stepped piston 94, respectively. A leg 178 defined by the sealing member 172 opposes the lip 174 and defines a multitude of axially extending grooves 180. An annular protrusion 182 defined by the sealing member 172 extends axially toward the valve member 152. A recess 184 on the valve member 152 receives the lip 176 so that the protrusion 182 is sealingly engageable with the valve member 152. The valve member 152 and sealing member 172 cooperate to define an annular intermediate chamber 186 communicating with the reservoir 38 via an axially extending radial clearance or groove 188, an aperture 190 in the sleeve member 60 and the passage 30. The small diameter portion 104 of stepped piston 94 defines an axially extending notch 65 similar to the notch 64 on the cup-shaped piston 50 so that the chamber 108 is communicated with the reservoir 38.

Figure 3:
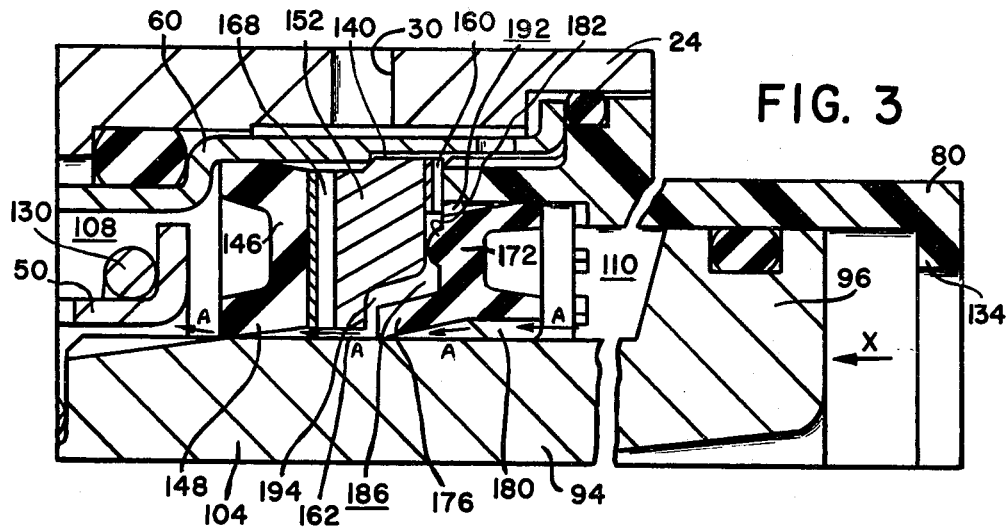
FIG. 3 is a fragmentary view similar to FIG. 2 illustrating the master cylinder during the initial phase of a brake application.

FIG. 3 illustrates the master cylinder 10 during the initial phase of a brake application. When a vehicle operator pivots the brake pedal 12 clockwise, an operator input force is transmitted to the stepped piston 94 via the input rod 14, moving the stepped piston 94 leftwardly (as is illustrated by arrow X) within the housing 24 from the nonbraking position illustrated by FIGS. 1 and 2. Because the preload and/or spring rate of the compression spring 120 is greater than that of spring 130, the cup-shaped piston 50 moves leftwardly contracting the spring 130 so that the chamber 108 is not substantially changed in volume. Consequently, the cup-shaped piston 50 and stepped piston 94, and the notches 64 and 65 thereon, simultaneously move leftwardly relative to the lip seals 52 and 146 to trap fluid in the chambers 54 and 108, respectively. At the same time, leftward movement of the stepped piston 94 relative the bearing member 80 contracts the chamber 110 pressurizing the fluid therein. The pressurized fluid trapped in chamber 110 moves the sealing member 172 leftwardly so that the annular protrusion 182 sealingly engages the valve member 152 dividing the intermediate chamber 186 into a radially outer portion 192 and a radially inner portion 194. Consequently, further leftward movement of the stepped piston 94 forces pressurized fluid through the grooves 180, past the lip 176, through the radially inner portion 194 of intermediate chamber 186, through the clearance 162, past the lip 148 and into the chamber 108 (as is represented by arrows A).

Leftward movement of the stepped piston 94 traps and pressurizes fluid in the chamber 108 and forces pressurized fluid from the chamber 110 into the chamber 108. Pressurized fluid in the chamber 108 in combination with the contraction of spring 120 moves the cup-shaped piston 50 leftwardly trapping and pressurizing fluid in the chamber 54. Consequently, pressurized fluid is forced from the outlets 44 and 46 through the conduits 16 and 18 to actuate the brakes 20 and 22.

Viewing FIG. 3, the initial phase of a brake application is characterized by pressurized fluid in the chamber 110 forcing the sealing member 172 into sealing engagement with the valve member 152. Pressurized fluid in the radially inner portion 194 of the intermediate chamber 186 has a slightly lower pressure than the fluid in the chamber 110 because of the pressure drop caused by the lip 176. Similarly, pressurized fluid in the chamber 108 has a slightly lower pressure than the fluid in the radially inner portion 194 of the intermediate chamber 186 because of the pressure drop caused by the lip 148. Of course, the radially outer portion 192 of the intermediate chamber 186 is maintained at substantially atmospheric pressure because of its communication with the reservoir 38 via passage 30. It will be noted that the pressure forces acting on the lip seal 146 and sealing member 172 are transferred to the valve member 152 so that the force equilibrium equation for the valve member 152 with leftwardly directed forces considered as positive is believed to be as follows:

$$(P_{110} \times A_{172}) + F_{160} - (P_{108} \times A_{146}) - (P_{194} \times A_{152}) = 0$$

Where:
$P_{110}$ = the fluid pressure in chamber 110
$A_{172}$ = the effective area of sealing member 172 which is exposed to $P_{110}$
$F_{160}$ = the spring force provided by spring 160
$P_{108}$ = the fluid pressure in chamber 108
$A_{146}$ = the effective area of lip seal 146 which is exposed to $P_{108}$
$P_{194}$ = the fluid pressure in the radially inner portion 194 of the intermediate chamber 186
$A_{152}$ = the effective annular area defined by the valve member 152 radially inwardly of the valve seat 140 and radially outwardly of the sealing engagement of protrusion 182 with the valve member 152

The last term, i.e. ($P_{194} \times A_{152}$), of the above equation exists and is negative because the clearance 162 and radially extending grooves 168 communicate the pressurized fluid from the radially inner portion 194 of the intermediate chamber 186 to the left side of the valve member 152 where it is opposed only by the fluid at atmospheric pressure in the radially outer portion 192 of the intermediate chamber 186.

Inspection of the above equation and of FIG. 3 will reveal that because the effective area of lip seal 146 is greater than the effective area of sealing member 172, as the fluid pressures in chambers 108 and 110 and chamber portion 194 are increased during a brake application by leftward movement of the stepped piston 94, pressures will be reached in the chambers 108 and 110 and portion 194 which overcome the spring force $F_{160}$ provided by spring 160 and disengage the valve member 152 from the seat 140.

The pressures needed to disengage the valve member 152 from the seat 140 are predetermined by selecting the relevant physical parameters of the component parts of the master cylinder. For example, the pressure drops caused by the lips 176 and 148 may be predetermined by making the lip seal 146 and sealing member 172 from elastomeric materials having predetermined hardnesses or resiliencies. Consequently, the pressure differential between the pressure chambers 108 and 110 may be predetermined. Additionally, the effective areas defined by the lip seal 146 and sealing member 172 may be varied so that the differential area ($A_{146} - A_{172}$) defined by the valve apparatus 106 is changed. Finally, the preload and/or spring rate of the wave spring 160 may be changed to vary the force needed to unseat the valve member 152.

Figure 4:
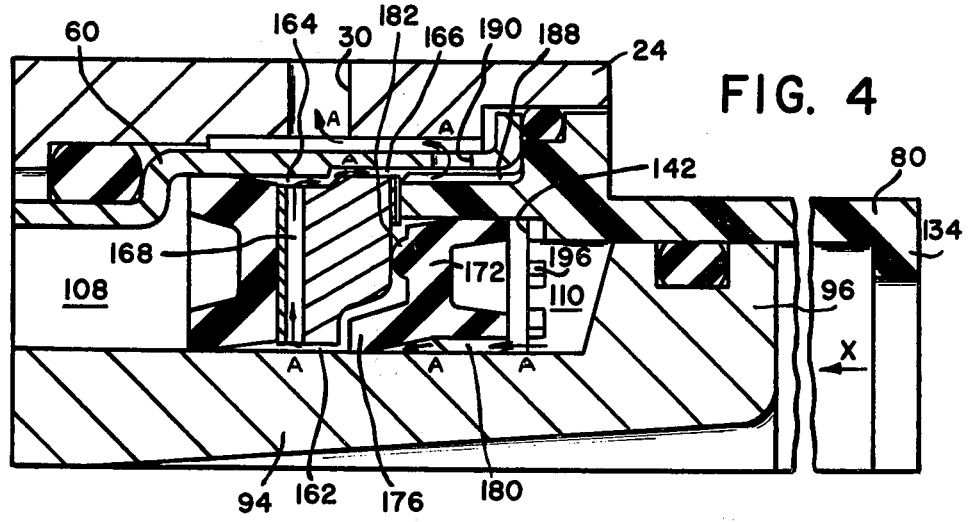
FIG. 4 is a fragmentary view similar to FIGS. 2 and 3 illustrating the master cylinder during a later phase of a brake application.

FIG. 4 illustrates the master cylinder 10 during a later phase of a brake application after the valve member 152 has been unseated. When the valve member 152 is unseated, pressurized fluid flows from the pressure chamber 110 through the grooves 180, past the lip 176, through the clearance 162, groove 168, clearances 164 and 166, groove 188, aperture 190 and passage 30 to the reservoir 38 (as is represented by arrows A). Consequently, the fluid pressure in the pressure chamber 110 is reduced substantially to atmospheric pressure (allowing for the pressure drop caused by lip 174). The term $P_{110} \times A_{172}$ in the above equation is reduced to substantially zero so that the fluid pressure in chamber 108 urges the lip seal 146 and valve member 152 rightwardly to maintain the valve member 152 unseated. The valve member 152 moves rightwardly to contract the wave spring 160 to a solid position anchoring on the end edge 144 of the bearing member 80.

During the later phase of a brake application, the operator input force is not substantially opposed by fluid pressure in the chamber 110. As a result, the input force is effective to move the stepped piston 94 leftwardly (as is illustrated by arrow X) to pressurize the fluid in the chambers 54 and 108 with a high degree of efficiency.

Figure 5:
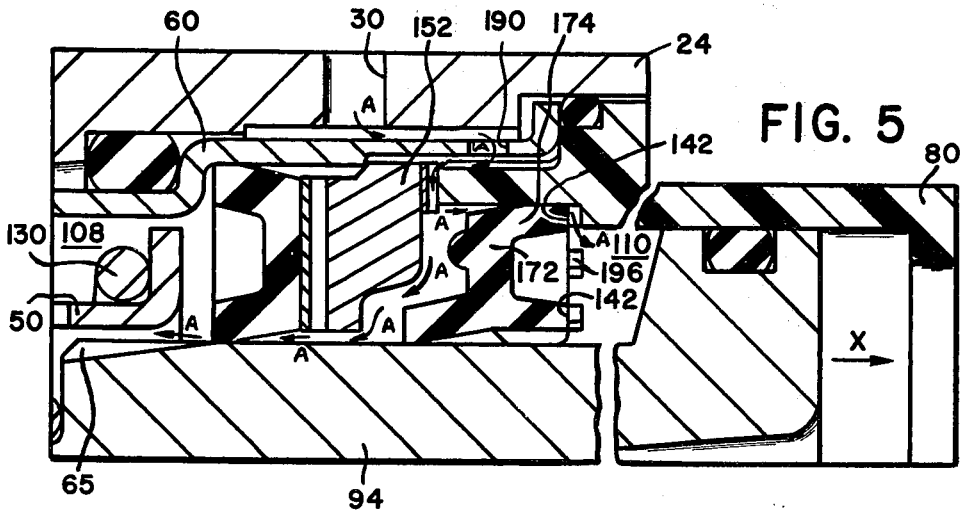
FIG. 5 is a fragmentary view similar to FIGS. 2–4 illustrating the master cylinder during a recovery phase following a brake application.

FIG. 5 illustrates the master cylinder 10 during a recovery phase during which the vehicle operator is relieving the input force after a brake application. As the stepped piston 94 moves rightwardly (as is illustrated by arrow X), the chamber 110 increases in volume and the fluid pressure therein is decreased to a pressure slightly lower than atmospheric. Consequently, the sealing member 172 is moved rightwardly into engagement at its lip 174 with the step 142 defined by the bearing member 80. Fluid from the reservoir 38 flows past the lip 174 and into the chamber 110 (as is represented by the arrows A). A multitude of notches 196 on the step 142 prevent the lip 174 from sealingly engaging the step 142 and facilitate replenishment of the chamber 110.

Similarly, as the stepped piston 94 moves rightwardly, the fluid pressure in chamber 108 is reduced. In the event that the volume of chamber 108 increases at a faster rate than fluid is returned from the brakes 20 so that a subatmospheric pressure is created in chamber 108, fluid from the reservoir 38 flows past the lip 148 to replenish the chamber 108 (as is represented by the arrows A viewing FIG. 5). Of course, the cup-shaped piston 50 also moves rightwardly to its nonbraking position. When the stepped piston 94 and cup-shaped piston 50 return to their nonbraking positions, the notches 64 and 65 provide for pressure equilibrium of the pressure chambers 108 and 110 with the reservoir 38 and also provide for complete filling with fluid of the chambers 108 and 110.

I claim:

1. A master cylinder comprising a housing defining an elongated bore therein and a fluid reservoir communicating with said bore via a passage, a stepped piston movably received in said bore and cooperating with said housing to define a pair of pressure chambers, valve means circumscribing said piston and sealingly cooperating with said piston and housing for controlling fluid communication through said passage, said valve means including an annular valve member movably cooperating with a valve seat defined by a step on said housing bore to control fluid flow from one of said pair of pressure chambers to said reservoir via said passage, said annular valve member is reciprocably received in said bore, an annular lip seal received in said bore and engageable with said valve member and including a pair of yieldable concentric lips disposed away from said valve member and toward one of said pair of pressure chambers, said pair of lips sealingly and movably cooperating with said stepped piston and with said housing; an annular sealing member received in said bore and engageable with said valve member and including a pair of radially spaced oppositely disposed yieldable lips sealingly cooperating with said stepped piston and with said housing; the radially outer of said sealing member lips being disposed toward the other of said pressure chambers and cooperating with said housing, said sealing member defining an axially extending leg opposing said radially outer lip and movably cooperating with said stepped piston, said axially extending leg defining an axially extending groove communicating said other pressure chamber with the radially inner sealing member lip, said sealing member and said valve member cooperating to define an intermediate chamber communicating with said reservoir via said passage, said sealing member defining an axially extending annular protrusion projecitng toward and sealingly engageable with said valve member to divide said intermediate chamber into a radially outer portion communicating with said reservoir via said passage and a radially inner portion, said valve member defining passage means communicating said radially inner portion with said valve seat and said valve member communicating said radially inner portion with said reservoir when said valve member is disengaged from said valve seat, and resilient means for urging said valve member toward said one pressure chamber and into sealing engagement with said valve seat.

2. The invention of claim 1 wherein said housing defines a multitude of steps on said bore, said steps cooperating to define an annular recess receiving said valve means, said lip seal being engageable with one of said steps to limit the movement of said lip toward said one pressure chamber, the radially outer lip of said sealing member being engageable with a second of said steps to limit the movement of said sealing member toward the other of said pressure chambers, said valve member being reciprocably received between said lip seal and said sealing member and between a third of said steps and said valve-seat-defining step.

3. The invention of claim 1 or 2 wherein said resilient means includes an annular wave spring.

4. A master cylinder comprising a housing defining a bore, fluid reservoir communicating with said bore via a passage, a stepped piston reciprocably received in said bore and cooperating with said housing to substantially define a pair of variable-volume chambers, and valve means for controlling fluid communication between one of said pair of variable-volume chambers and said reservoir via said passage, characterized in that said valve means is annular and circumscribes a portion of said stepped piston, said valve means being movable in said bore in response to movement of said piston and/or fluid pressure in one of said variable-volume chambers, said stepped piston defines a small diameter portion and a large diameter portion, said valve means circumscribing said small diameter portion and cooperating therewith to bound said pair of variable-volume pressure chambers, said valve means including a pressure responsive annular lip seal defining an effective area exposed to the other of said pair of pressure chambers, said lip seal having a pair of radially spaced concentric yieldable lips disposed toward said other pressure chamber and sealingly and movably cooperating with said stepped piston and with said housing, respectively; a pressure responsive annular valve member engageable with said lip seal and sealingly cooperating with a valve seat defined by a step on said bore, resilient means for yieldably biasing said valve member toward said other pressure chamber and into sealing engagement with said valve seat, a pressure responsive annular sealing member defining an effective area exposed to said one pressure chamber, the effective area of said sealing member being less than said effective area of said lip seal, said sealing member defining an axially extending protrusion projecting toward and sealingly engageable with said valve member, said valve member and said sealing member cooperating to define an intermediate chamber communicating via said passage with said reservoir; said sealing member having a pair of oppositely disposed, radially spaced, yieldable lips; the radially inner of said sealing member lips cooperating with said stepped piston and being disposed toward said intermediate and said other pressure chambers, the radially outer of said sealing member lips cooperating with said housing and being opposed by an axially extending leg defined by said sealing member, said leg movably engaging said stepped piston and defining an axially extending groove communicating said one pressure chamber with said radially inner lip, said valve member defining passage means extending from said valve seat to said intermediate chamber, said passage means opening to said intermediate chamber radially inwardly of said annular protrusion and further communicating with one of the lips of said lip seal, said stepped piston moving within said bore responsive to an operator input to trap and pressurize fluid in said pair of pressure chambers, said sealing member moving into sealing engagement at said annular protrusion with said valve member in response to fluid pressure in said one pressure chamber to divide said intermediate chamber into a radially outer portion communicating with said reservoir via said passage and with said valve seat and into a radially inner portion, the radially inner lip of said sealing member yielding and allowing pressurized fluid flow from said one pressure chamber into said radially inner portion and said passage means communicating said pressurized fluid to said one lip of said lip seal, said one lip of said lip seal yielding to allow pressurized fluid flow from said radial inner portion to said other pressure chamber, said valve means moving in response to pressurized fluid in said pair of pressure chambers to disengage said valve member from said valve seat, said passage means communicating said radially inner portion with said radially outer portion via said valve seat so that said one pressure chamber is communicated with said reservoir via a flow path defined by the cooperation of said axially extending groove, said radially inner lip, said radially inner portion, said passage means, said valve seat, said radially outer portion and said passage.

5. The invention of claim 4 wherein said stepped piston moves within said bore in response to an operator input to expand said pair of pressure chambers, said sealing member disengaging from said valve member and moving toward said one pressure chamber responsive to the expansion thereof and into engagement at said radially outer lip with a step defined on said bore, said radially outer lip yielding to allow fluid to flow from said reservoir into said one pressure chamber via said passage and intermediate chamber.

6. The invention of claim 5 wherein said one lip of said lip seal yields responsive to the expansion of said other pressure chamber to allow fluid to flow from said reservoir into said other pressure chamber via said passage, said intermediate chamber, and said passage means.

* * * * *